United States Patent
Podvalny et al.

(10) Patent No.: US 8,843,690 B2
(45) Date of Patent: Sep. 23, 2014

(54) MEMORY CONFLICTS LEARNING CAPABILITY

(75) Inventors: Dmitry Podvalny, Petah Tikva (IL); Alex Shinkar, Rishon-Lezion (IL); Assaf Rachlevski, Modiin (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 678 days.

(21) Appl. No.: 13/179,709

(22) Filed: Jul. 11, 2011

(65) Prior Publication Data

US 2013/0019047 A1    Jan. 17, 2013

(51) Int. Cl.
*G06F 12/00* (2006.01)
*G06F 12/08* (2006.01)

(52) U.S. Cl.
CPC .................... *G06F 12/08* (2013.01)
USPC ............ 711/3; 711/100; 711/117; 711/154

(58) Field of Classification Search
CPC ............................ G06F 12/00; G06F 12/0215
USPC ...................... 711/3, 100, 117, 154
See application file for complete search history.

(56) References Cited

U.S. PATENT DOCUMENTS

| | | | |
|---|---|---|---|
| 5,551,005 A | 8/1996 | Sarangdhar et al. | 395/472 |
| 5,557,768 A | 9/1996 | Braceras et al. | 395/458 |
| 6,539,457 B1 | 3/2003 | Mulla et al. | 711/131 |
| 6,625,695 B2 * | 9/2003 | Fanning | 711/134 |
| 6,706,914 B2 * | 3/2004 | Schiødt | 562/1 |
| 6,748,498 B2 | 6/2004 | Gharachorloo et al. | 711/141 |
| 6,845,429 B2 | 1/2005 | Mattausch et al. | 711/131 |
| 7,073,026 B2 | 7/2006 | Alsup | 711/118 |
| 7,299,318 B2 * | 11/2007 | Stoutamire | 711/118 |
| 2012/0198121 A1 * | 8/2012 | Bell et al. | 711/3 |

* cited by examiner

*Primary Examiner* — Tuan Thai
(74) *Attorney, Agent, or Firm* — Christopher P. Maiorana, PC

(57) ABSTRACT

An apparatus having a memory and circuit is disclosed. The memory may (i) assert a first signal in response to detecting a conflict between at least two addresses requesting access to a block at a first time, (ii) generate a second signal in response to a cache miss caused by an address requesting access to the block at a second time and (iii) store a line fetched in response to the cache miss in another block by adjusting the first address by an offset. The second time is generally after the first time. The circuit may (i) generate the offset in response to the assertion of the first signal and (ii) present the offset in a third signal to the memory in response to the assertion of the second signal corresponding to reception of the first address at the second time. The offset is generally associated with the first address.

20 Claims, 5 Drawing Sheets

MEMORY CONFLICTS LEARNING CAPABILITY

FIELD OF THE INVENTION

The present invention relates to cache conflicts generally and, more particularly, to a method and/or apparatus for implementing a memory conflicts learning capability.

BACKGROUND OF THE INVENTION

Caches are conventionally used to improve processor core performance in systems where the data accessed by the processor core is located in slow and/or far memory (i.e., double data rate 3 memory). A usual cache strategy is to bring a line of data on any data request from the processor core that causes a cache miss and store the line of data in the local cache memory. A subsequent accesses to the same line is handled by the cache and the local cache memory is accessed.

Simultaneous accesses to the same bank in the local cache memory cause conflicts. Stalls in the processor cores are created by the conflicts in the cache. The stalls cause degradations in application cycle counts.

It would be desirable to implement a memory conflicts learning capability.

SUMMARY OF THE INVENTION

The present invention concerns an apparatus generally having a memory and a circuit. The memory may (i) assert a first signal in response to detecting a conflict between at least two addresses requesting access to a block at a first time, (ii) generate a second signal in response to a cache miss caused by an address requesting access to the block at a second time and (iii) store a line fetched in response to the cache miss in another block by adjusting the first address by an offset. The second time is generally after the first time. The circuit may (i) generate the offset in response to the assertion of the first signal and (ii) present the offset in a third signal to the memory in response to the assertion of the second signal corresponding to reception of the first address at the second time. The offset is generally associated with the first address.

The objects, features and advantages of the present invention include providing a memory conflicts learning capability that may (i) learn address conflicts caused by two or more simultaneous access requests to the same memory block, (ii) avoid future stalls by the same conflicting addresses, (iii) store the conflicting cache lines in different memory blocks, (iv) implement the cache memory as a single port memory and/or (v) keep the learned conflicts in a nonvolatile memory.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention generally provide a circuit (or block) that is capable of automatically learning access request conflicts to blocks (or banks) in a cache memory. The learning circuit may automatically generate a lookup table containing the conflicting addresses. Entries in the lookup table may be used at a later time to avoid stalls caused by reoccurrences of the conflicting access requests. Once a conflict has been learned, a subsequent a cache miss caused by at least one of the conflicting addresses may result in a cache line being fetched from an external memory. The fetched cache line may be stored in the cache memory with a calculated offset. The offset generally moves the fetched cache line into a different block in the cache memory. The offsets that may help to reduce or eliminate the number of future stalls caused by future simultaneous access requests that would have caused a conflict because of an access to the same block of the cache memory.

Figure 1:
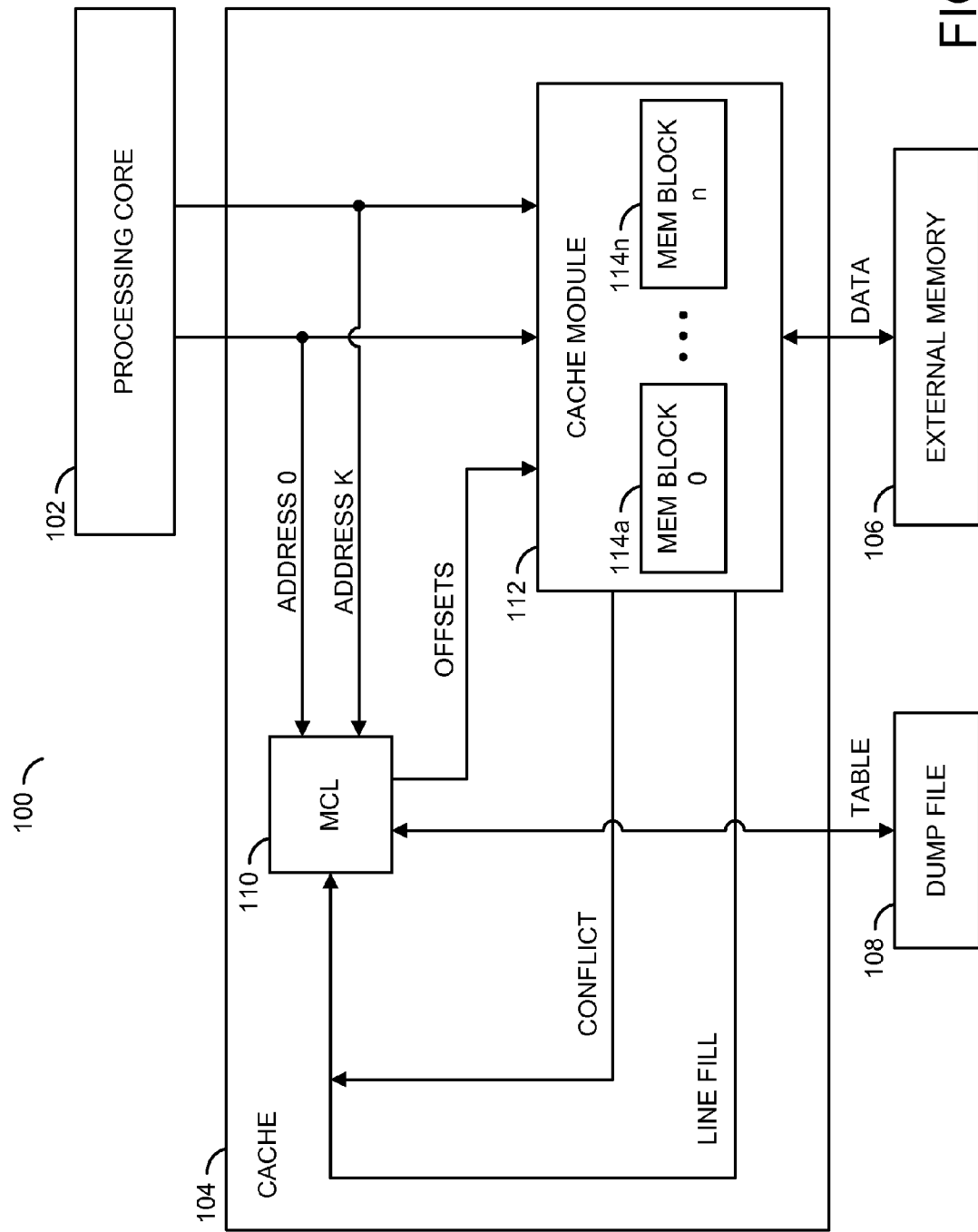
FIG. 1 is a block diagram of an apparatus in accordance with a preferred embodiment of the present invention.

Referring to FIG. 1, a block diagram of an apparatus 100 is shown in accordance with a preferred embodiment of the present invention. The apparatus (or circuit or device or integrated circuit) 100 may implement an electronic system having a capability to learn memory access conflicts and subsequently avoid such conflicts. The apparatus 100 generally comprises a block (or circuit) 102, a block (or circuit) 104, a block (or circuit) 106 and a block (or circuit) 108. The circuit 104 generally comprises a block (or circuit) 110 and a block (or circuit) 112. The circuits 102-112 may represent modules and/or blocks that may be implemented as hardware, software, a combination of hardware and software, or other implementations.

One or more signals (e.g., ADDRESS 0-ADDRESS K) may be generated by the circuit 102 and presented to the circuits 110 and 112. A bi-directional signal (e.g., TABLE) may be exchanged between the circuit 112 and the circuit 108. The circuit 112 and the circuit 106 may exchange a bi-directional signal (e.g., DATA). A signal (e.g., OFFSETS) may be generated by the circuit 110 and received by the circuit 112. The circuit 112 may generate a signal (e.g., CONFLICT) that is presented to the circuit 110. A signal (e.g., LINE FILL) may be generated by the circuit 112 and received by the circuit 110.

The circuit 102 may implement a processor core circuit generally having one or more processors. The circuit 102 may be operational to process data by executing one or more application programs. During the execution, the application programs may generate multiple address values in one or more of the signals ADDRESS 0-ADDRESS K that access (e.g., read from or write to) the circuit 106. In some instances, two or more of the address values may attempt to access different cache lines in the same memory block within the circuit 112 substantially simultaneously. Such simultaneous accesses to the same memory block generally causes a conflict. When a conflict occurs, the circuit 102 may have to stall the one or more applications and wait for the conflict to be resolved.

The circuit 104 may implement a cache circuit. The circuit 104 is generally operational to perform cache operations that service requests generated by the circuit 102. The cache operations generally include, but are not limited to, read access requests, write access requests, fetch requests and prefetch requests. The circuit 104 may be operational to detect conflicting access requests. The circuit 104 may also be operational to detect cache read misses and cache write misses based on requests from the circuit 102. When a cache read miss or a cache write miss occurs, the circuit 104 may fetch the missing cache line from the circuit 106 via the signal DATA. Once the missing cache line has been stored in the circuit 104, the circuit 104 may respond to the access request which caused the cache miss. Instantiations of the circuit 104 may operate as a first level cache, a second level cache and/or a third level cache in a system.

The circuit 106 may implement a main (or external) memory circuit. The circuit 106 is generally operational to store data, program instructions, commands, tasks and other information used by the circuit 102 and optionally other circuitry of the apparatus 100. In some embodiments, the circuit 106 may be fabricated on the same die (or chip) as the circuits 102 and 104. In other embodiments, the circuit 106 may be fabricated on a different die (or chip) as the circuits 102 and 104.

The circuit 108 may implement a nonvolatile memory circuit. The circuit 108 is generally operational to store one or more records, referred to as dump files, generated by the circuit 104 and received in the signal TABLE. The circuit 108 may receive a dump file from the circuit 104 as a single record or as incremental updates that are added to the records. The circuit 108 may also be operational to transfer the dump files back to the circuit 104 in the signal TABLE.

The circuit 110 may implement a memory conflict learning circuit. The circuit 110 generally receives stall indications for memory conflicts from the circuit 112, evacuation indications from the circuit 112 and memory address values from the circuit 102. The circuit 110 is generally operational to calculate and store one or more block offset values in response to an assertion of the signal CONFLICT corresponding to a reception of the signals ADDRESS 0-ADDRESS K from the circuit 102. The block offset values are generally calculated proximate the time when the access conflict is detected. Each of the block offset values is generally associated with a corresponding address value received in the signals ADDRESS 0-ADDRESS K. At least one of the block offset values may be a null value (e.g., a zero value). After a block offset value has been stored, when the circuit 110 detects the assertion of the signal LINE FILL associated with the reception of the address value corresponding to the stored block offset value, the circuit 110 may present the stored block offset value in the signal OFFSET to the circuit 112. The presentation of the stored block offset value may occur at a time later than the conflict detection time. Thereafter, the circuit 110 may present the stored block offset values in the signal OFFSET each time that the corresponding address value is received from the circuit 102.

The circuit 110 may also be operational to generate the dump files, write the dump files to the circuit 108 and read the dump files from the circuit 108. In some embodiments, a dump file may be written to the circuit 108 upon termination of the corresponding application program (or programs). In other embodiments, portions of the dump file may be created and written into the circuit 108 as each new access conflict is learned. When the application program (or programs) are loaded and start to execute, the corresponding dump file may be transferred from the circuit 108 back to the circuit 110.

For example, after execution of some part of an application program that generates conflicting access requests, the circuit 110 may generate and buffer information per Table I as follows:

TABLE I

| Line start address | Line start address |
|---|---|
| 0x123480 | 1 |
| 0xabcd00 | 5 |
| ... | ... |

On a next fill of the line with address 0x123480, the fill into the circuit 112 may start in memory block 1 (e.g., block 114b), instead of a default memory block 0 (e.g., block 114a). Similarly, the line for address 0xabcd00 may start filling in memory block 5 (e.g., block 114f), instead of the default memory block 0.

Figure 2:
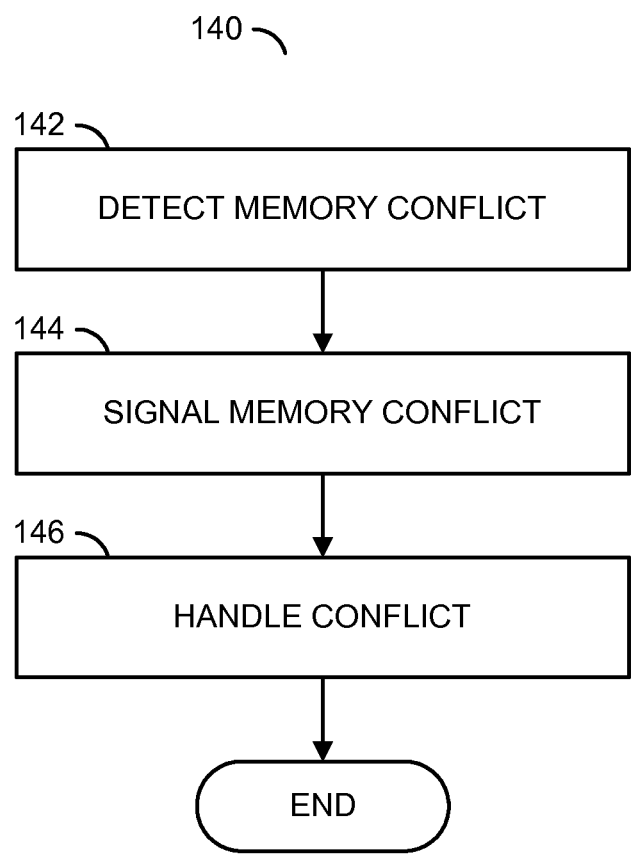
FIG. 2 is a flow diagram of an example method to detect an access conflict.

Referring to FIG. 2, a flow diagram of an example method 140 to detect an access conflict is shown. The method (or process) 140 generally comprises a step (or state) 142, a step (or state) 144 and a step (or state) 146. The method 140 may be implemented by the circuit 112. The steps 142 to 146 may represent modules and/or blocks that may be implemented as hardware, firmware, software, a combination of hardware, firmware and/or software, or other implementations.

In the step 142, the circuit 112 may detect a memory access request conflict to a common memory block (or bank) between two or more address values. A conflict may arise when two or more address values concurrently access two or more cache lines within the common memory block. The conflict may be caused by an inability of the cache memory to access multiple cache lines simultaneously from within a single memory block. For example, the circuit 102 may issue concurrent access requests to access (i) a data word in a cache line A at an address value A, (ii) a data word in a cache line B at an address value B and (iii) a data work in a cache line C at an address value C, where all of the cache lines A, B and C are within the memory block 114b.

When a conflict is detected, the circuit 112 may generate the signal CONFLICT in an asserted state (e.g., a logical true or high value). When no conflict is detected, the circuit 112 may generate the signal CONFLICT in a deasserted state (e.g., a logical false or low value). In the step 146, the circuit 112 may handle the conflict. Handling of the conflict may be implement by any one or more techniques. For example, the circuit 112 may initially respond to the address value having the lowest value among the conflicting address values. Thereafter, the circuit 112 may respond to the next lowest address value, and so on until all of the requested addresses have been serviced. Other conflict resolution techniques may be implemented to meet the criteria of a particular application.

Figure 3:
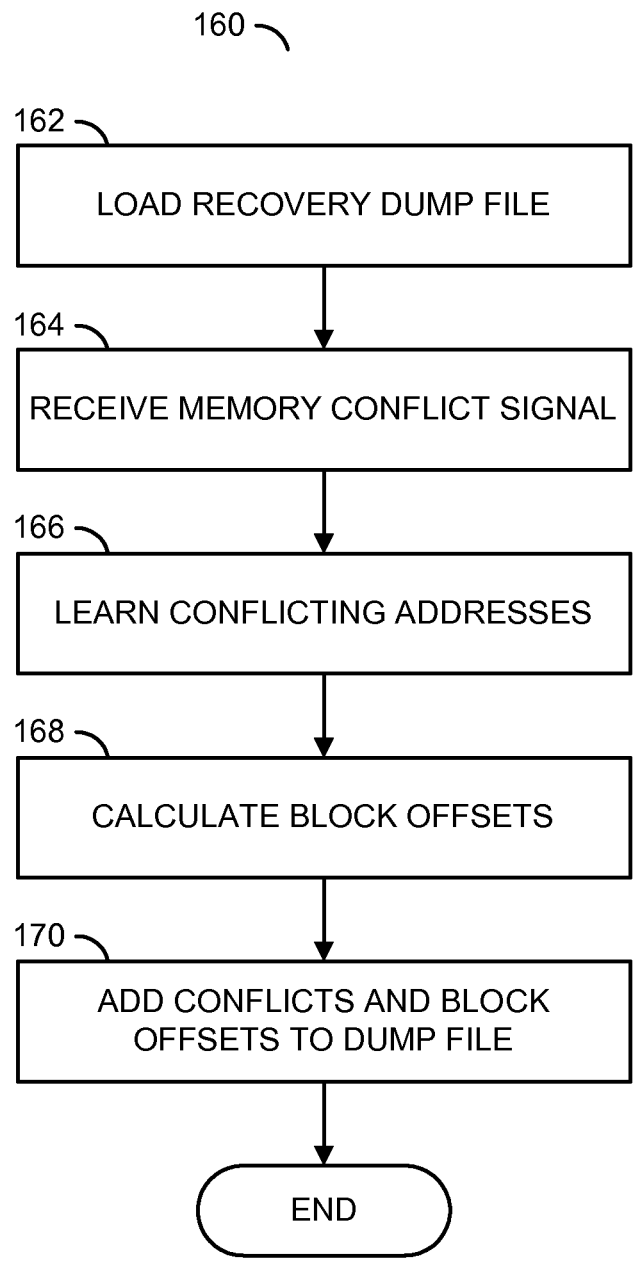
FIG. 3 is a flow diagram of an example method to learn memory access conflicts.

Referring to FIG. 3, a flow diagram of an example method 160 to learn memory access conflicts is shown. The method (or process) 160 generally comprises a step (or state) 162, a step (or state) 164, a step (or state) 166, a step (or state) 168 and a step (or state) 170. The method 160 may be implemented by the circuit 110. The steps 162 to 170 may represent modules and/or blocks that may be implemented as hardware, firmware, software, a combination of hardware, firmware and/or software, or other implementations.

If a dump file was previously created and stored in the circuit 108, the circuit 110 may load the previous dump file into a lookup table in the step 162. If no previous dump file is available for the application programs, the lookup table may be initialized as an empty table in the step 162. The circuit 110 may receive the signal CONFLICT in the asserted state in the step 164. When the signal CONFLICT is seen in the asserted state, the circuit 110 may learn the address values causing the conflict by monitoring the signals ADDRESS 0-ADDRESS K in the step 166. Returning to the example used in FIG. 2, the circuit 110 may learn that the address value A, the address value B and the address value C may be simultaneous access requests for the cache line A, the cache line B and the cache line C in the same block 114b.

In the step 168, the circuit 110 may calculate one or more block offset values for the conflicting address values. For example, the circuit 110 may calculate an offset of 3 blocks for conflicted address value B and an offset of 4 blocks for conflicted address value C. In some embodiments, the address value A may be considered non-conflicting and thus does not have an block offset values. In other embodiments, the address value A may be considered a conflicted address with a null (zero) offset value. The block offset values and the corresponding address values may be stored in the lookup table within the circuit 110. In some embodiments, each time that a new block offset value is calculated, the block offset value and the corresponding address value may be written into the dump file in the step 170. In other embodiments, the entire contents of the lookup table may be written to the dump file in the step 170 when the corresponding application program (or programs) is terminated.

Figure 4:
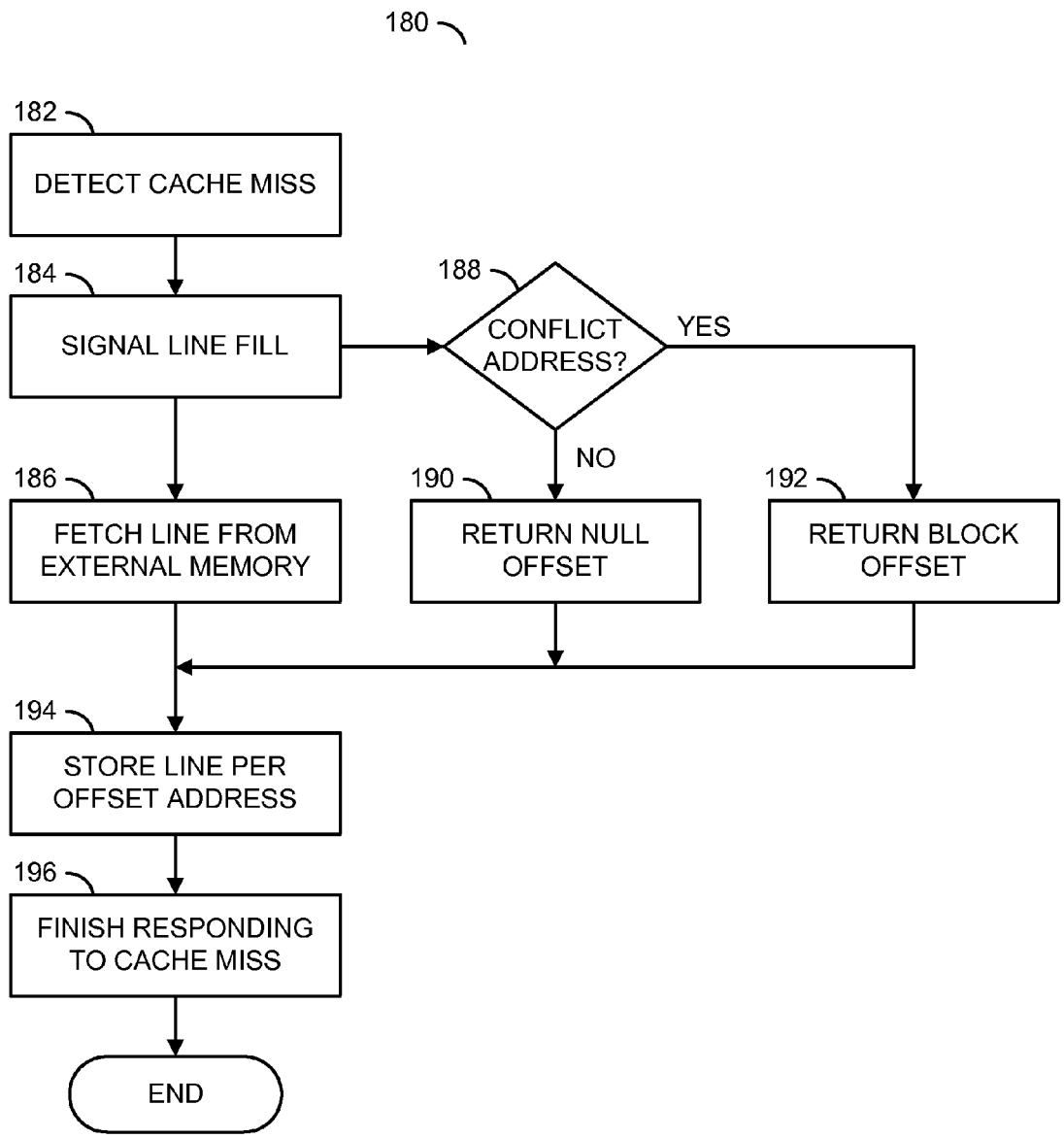
FIG. 4 is a flow diagram of an example method to offset a line fetch.

Referring to FIG. 4, a flow diagram of an example method 180 to offset a line fetch is shown. The method (or process) 180 generally comprises a step (or state) 182, a step (or state) 184, a step (or state) 186, a step (or state) 188, a step (or state) 190, a step (or state) 192, a step (or state) 194 and a step (or state) 196. The method 180 may be implemented by a combination of the circuit 110 and the circuit 112. The steps 182 to 196 may represent modules and/or blocks that may be implemented as hardware, firmware, software, a combination of hardware, firmware and/or software, or other implementations.

In the step 182, the circuit 112 may detect a cache miss caused by an access request (e.g., a read access or a write access) received from the circuit 102. For example, the circuit 102 may issue a read access request for a data word at the address value B in the cache line B in the memory block 114b. The circuit 112 may notify the circuit 110 that a line fill is about to take place by asserting the signal LINE FILL in the step 184. The circuit 112 may then fetch the appropriate line from the circuit 106 in the step 186.

Upon receipt of the asserted signal LINE FILL, the circuit 110 may check in the step 188 to see if the address value which caused the line fill is a know conflicted address. If the address value is not a known conflicted address, the circuit 110 may return a null offset value in the signal OFFSET to the circuit 112 in the step 190. If the address value is a previously learned conflicted address (e.g., the example address value B), the circuit 110 may read the corresponding block offset value (e.g., 3 blocks for the address value B) from the lookup table and return the block offset value to the circuit 112 in the step 192. When the circuit 112 receives the fetched cache line from the circuit 106, the circuit 112 may store the fetched cache line in an appropriate memory block 114a-114n by offsetting (e.g., adding) the address value with the block offset value in the step 194. Therefore, when the fetched cache line is actually written into the circuit 112, the fetched cache line may be located in a different block 114a-114n than originally intended. For example, when the cache line fetched for the cache miss at address value B is stored in the circuit 112, the corresponding block offset value of 3 may cause that fetched cache line to be stored in the block 114e instead of the block 114b (e.g., the block 114e may be apart from the block 114b by 3 blocks in the address space). The requested data value may then be read from the appropriate memory block 114e. In the step 196, the circuit 112 may finish responding to the access request that caused the cache miss in a normal manner.

Figure 5:
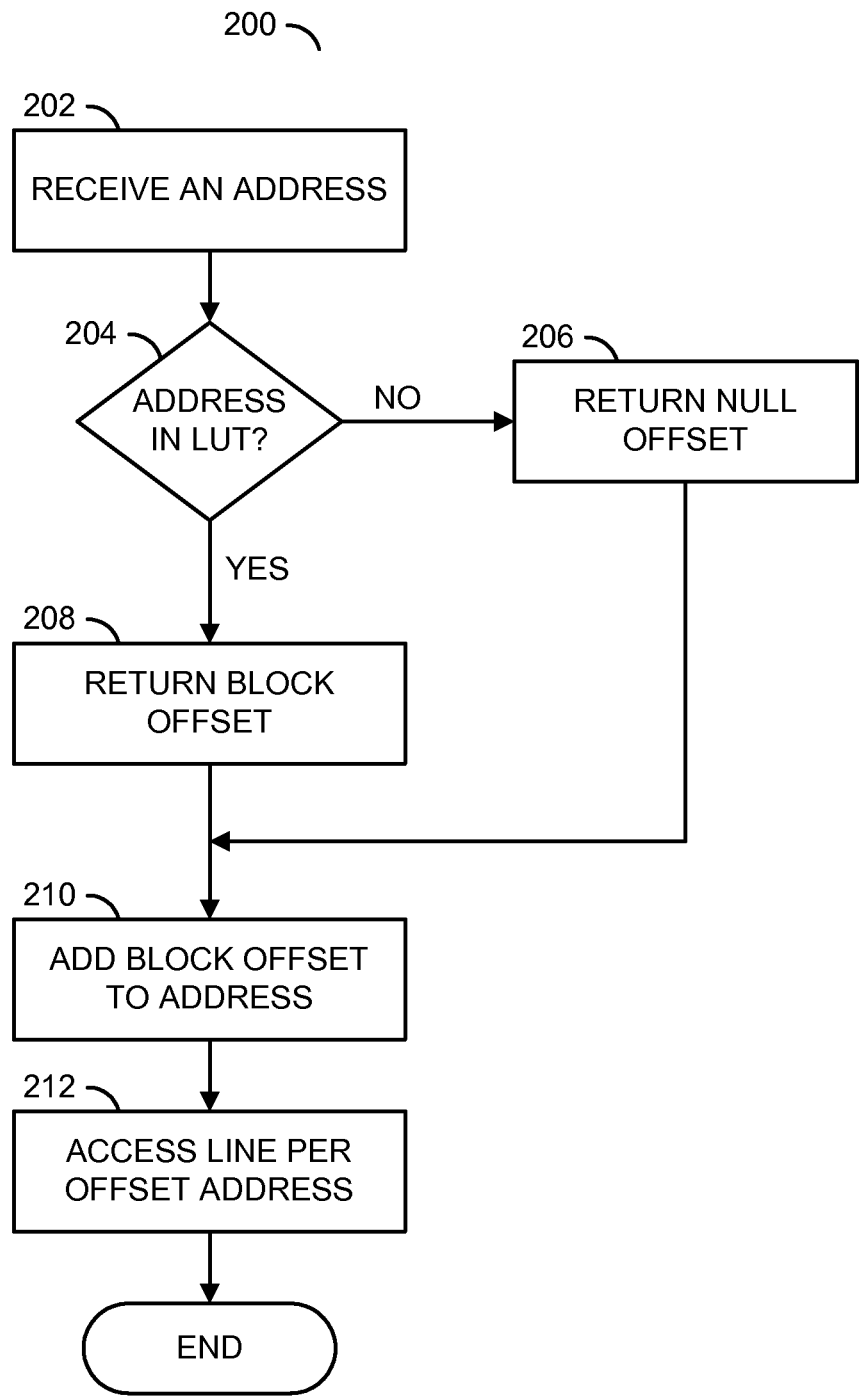
FIG. 5 is a flow diagram of an example method to avoid future access conflicts.

Referring to FIG. 5, a flow diagram of an example method 200 to avoid future access conflicts is shown. The method (or process) 200 generally comprises a step (or state) 202, a step (or state) 204, a step (or state) 206, a step (or state) 208, a step (or state) 210 and a step (or state) 212. The method 200 may be implemented by a combination of the circuit 110 and the circuit 112. The steps 202 to 212 may represent modules and/or blocks that may be implemented as hardware, firmware, software, a combination of hardware, firmware and/or software, or other implementations.

In the step 202, the circuit 110 and the circuit 112 may receive an address value from the circuit 102. The circuit 110 may compare the received address value with the conflicting address values previously stored in the lookup table in the step 204. If the received address value does not match any of the conflicted address values, the circuit 110 may return a null offset value to the circuit 112 in the step 206. If the received address value matches one of the conflicted address values in the lookup table (e.g., the example address value C), the circuit 110 may return the corresponding block offset value (e.g., the example block offset of 4 blocks) to the circuit 112 in the step 208. The circuit 112 may calculate an internal address value by offsetting the received address value by the offset value in the step 210. Using the internal address value, the circuit 112 may access the requested cache line from the appropriate block 114a-114n in the step 212. For example, the circuit 112 may offset the address value C by 4 blocks such that the requested data word may be read from the memory block 114f instead of the original memory block 114b (e.g., the memory block 114f is offset from the memory block 114b by 4 blocks in the address space).

The functions performed by the diagrams of FIGS. 1-5 may be implemented using one or more of a conventional general purpose processor, digital computer, microprocessor, microcontroller, RISC (reduced instruction set computer) processor, CISC (complex instruction set computer) processor, SIND (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIG. 1 represent logical data flows. The logical data flows are generally representative of physical data transferred between the respective blocks by, for example, address, data, and control signals and/or busses. The system represented by the apparatus 100 may be implemented in hardware, software or a combination of hardware and software according to the teachings of the present disclosure, as would be apparent to those skilled in the relevant art(s). As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a memory configured to (i) assert a first signal in response to detecting a conflict between at least two addresses requesting access to a first block of said memory at a first time, (ii) generate a second signal in response to a cache miss caused by a first address of said at least two addresses requesting access to said first block at a second time and (iii) store a first line of data fetched from external memory in response to said cache miss in a second block of said memory instead of said first block by adjusting said first address by a first address offset value, wherein said second time is after said first time; and a circuit configured to (i) generate said first address offset value in response to said assertion of said first signal and (ii) present said first address offset value in a third signal to said memory in response to said assertion of said second signal corresponding to reception of said first address at said second time, wherein said first address offset value is associated with said first address.

2. The apparatus according to claim 1, wherein (i) said circuit is further configured to present said first offset in said third signal to said memory in response to said first address requesting access to said first line at a third time and (ii) said third time occurs while said first line is stored in said second block.

3. The apparatus according to claim 2, wherein said circuit is further configured to access said first line in said second block at said third time by adding said first offset to said first address.

4. The apparatus according to claim 1, wherein (i) said circuit is further configured to generate a second offset in response to said assertion of said first signal and (ii) said second offset (a) is associated with a second address of said at least two addresses and (b) comprises a null value.

5. The apparatus according to claim 4, wherein (i) said circuit is further configured to present said second offset in said third signal to said memory in response to said second address requesting access to a second line in said first block at a second time and (ii) said second time is after said first time.

6. The apparatus according to claim 5, wherein said circuit is further configured to access said second line in said first block at said second time by adding said second offset to said second address.

7. The apparatus according to claim 1, wherein said circuit is further configured to download said first address and said first offset into a nonvolatile memory.

8. The apparatus according to claim 7, wherein said circuit is further configured to upload said first address and said first offset from said nonvolatile memory in response to restarting an application that previously caused said conflict.

9. The apparatus according to claim 1, wherein (i) said conflict causes a stall in one or more processors that generate said at least two addresses at said first time, (ii) a second line corresponding to a second of said at least two addresses is stored in said first block and (iii) storing said first line in said second block eliminates a reoccurrence of said stall by avoiding said conflict.

10. The apparatus according to claim 1, wherein said apparatus is implemented as one or more integrated circuits.

11. A method for learning memory conflicts, comprising the steps of:
(A) asserting a first signal in response to detecting a conflict between at least two addresses requesting access to a first block of a memory at a first time;
(B) generating a first address offset value in response to said assertion of said first signal, wherein said first offset is associated with a first address of said at least two addresses;
(C) generating a second signal in response to a cache miss caused by said first address requesting access to said first block at a second time, wherein said second time is after said first time;
(D) presenting said first offset in a third signal to said memory in response to said assertion of said second signal corresponding to reception of said first address at said second time; and (E) storing a first line of data fetched from external memory in response to said cache miss in a second block of said memory instead of said first block by adjusting said first address by said first offset.

12. The method according to claim 11, further comprising the step of:
presenting said first offset in said third signal to said memory in response to said first address requesting access to said first line at a third time, wherein said third time occurs while said first line is stored in said second block.

13. The method according to claim 12, further comprising the step of:
accessing said first line in said second block at said third time by adding said first offset to said first address.

14. The method according to claim 11, further comprising the step of:
generating a second offset in response to said assertion of said first signal, wherein said second offset (i) is associated with a second address of said at least two addresses and (ii) comprises a null value.

15. The method according to claim 14, further comprising the step of:
presenting said second offset in said third signal to said memory in response to said second address requesting access to a second line in said first block at a second time, wherein said second time is after said first time.

16. The method according to claim 15, further comprising the step of:
accessing said second line in said first block at said second time by adding said second offset to said second address.

17. The method according to claim 11, further comprising the step of:
downloading said first address and said first offset into a nonvolatile memory.

18. The method according to claim 17, further comprising the step of:
uploading said first address and said first offset from said nonvolatile memory in response to restarting an application that previously caused said conflict.

19. The method according to claim 11, wherein (i) said conflict causes a stall in one or more processors that generate said at least two addresses at said first time, (ii) a second line corresponding to a second of said at least two addresses is stored in said first block and (iii) storing said first line in said second block eliminates a reoccurrence of said stall by avoiding said conflict.

20. An apparatus comprising:
means for asserting a first signal in response to detecting a conflict between at least two addresses requesting access to a first block of a memory at a first time;
means for generating a first address offset value in response to said assertion of said first signal, wherein said first offset is associated with a first address of said at least two addresses;
means for generating a second signal in response to a cache miss caused by said first address requesting access to said first block at a second time, wherein said second time is after said first time;
means for presenting said first offset in a third signal to said memory in response to said assertion of said second signal corresponding to reception of said first address at said second time; and
means for storing a first line of data fetched from external memory in response to said cache miss in a second block of said memory instead of said first block by adjusting said first address by said first offset.

* * * * *